United States Patent [19]

Fourrey et al.

[11] Patent Number: 4,588,172
[45] Date of Patent: May 13, 1986

[54] DEVICE FOR LOCALLY ADJUSTING THE TENSION OF AN ELASTIC SHEET, IN PARTICULAR FOR A VEHICLE SEAT

[75] Inventors: Francois Fourrey, Montbeliard; Patrice Ciciliani, Seloncourt, both of France

[73] Assignee: Cycles Peugeot, Valentigney, France

[21] Appl. No.: 715,843

[22] Filed: Mar. 25, 1985

[30] Foreign Application Priority Data

Mar. 27, 1984 [FR] France .................. 84 04762

[51] Int. Cl.$^4$ ............................................. F16F 3/00
[52] U.S. Cl. ......................................... 267/89; 74/60; 297/284
[58] Field of Search .................. 267/89, 87, 93, 105, 267/133, 140.2, 143; 297/284; 5/446, 447, 433; 74/60, 96, 99 R

[56] References Cited

U.S. PATENT DOCUMENTS

| | | | |
|---|---|---|---|
| 1,012,851 | 12/1911 | Hodgkinson | 74/60 |
| 1,819,826 | 8/1931 | Sherman | 74/60 X |
| 3,095,188 | 6/1963 | Giese | 267/89 |
| 3,378,299 | 4/1968 | Sandor | 297/284 |
| 4,162,807 | 7/1979 | Yoshimura | 267/89 X |

FOREIGN PATENT DOCUMENTS

| | | |
|---|---|---|
| 1249102 | 8/1967 | Fed. Rep. of Germany . |
| 1274003 | 7/1968 | Fed. Rep. of Germany . |
| 1914154 | 6/1971 | Fed. Rep. of Germany . |
| 1755229 | 8/1971 | Fed. Rep. of Germany . |
| 2603980 | 8/1976 | Fed. Rep. of Germany . |
| 1020399 | 2/1966 | United Kingdom . |
| 1272929 | 5/1972 | United Kingdom . |

Primary Examiner—Bruce H. Stoner, Jr.
Assistant Examiner—Michael P. Gilday
Attorney, Agent, or Firm—Sughrue, Mion, Zinn, Macpeak and Seas

[57] ABSTRACT

In order to soften or stiffen the support offered by an elastic sheet, and in particular a vehicle seat back, the device comprises a flat spring (1) which is at each of its ends connected to the sheet (38), and fixed to a case (2, 3) containing an inclined disc (10, 12). Two discs are fixed to a control rod (24) which is mounted in the frame (36) of the seat and, when this rod is rotated, they cause the cases to be pivoted symmetrically, so that the spring is extended and stiffens the sheet or is shortened and renders the seat more soft.

11 Claims, 10 Drawing Figures

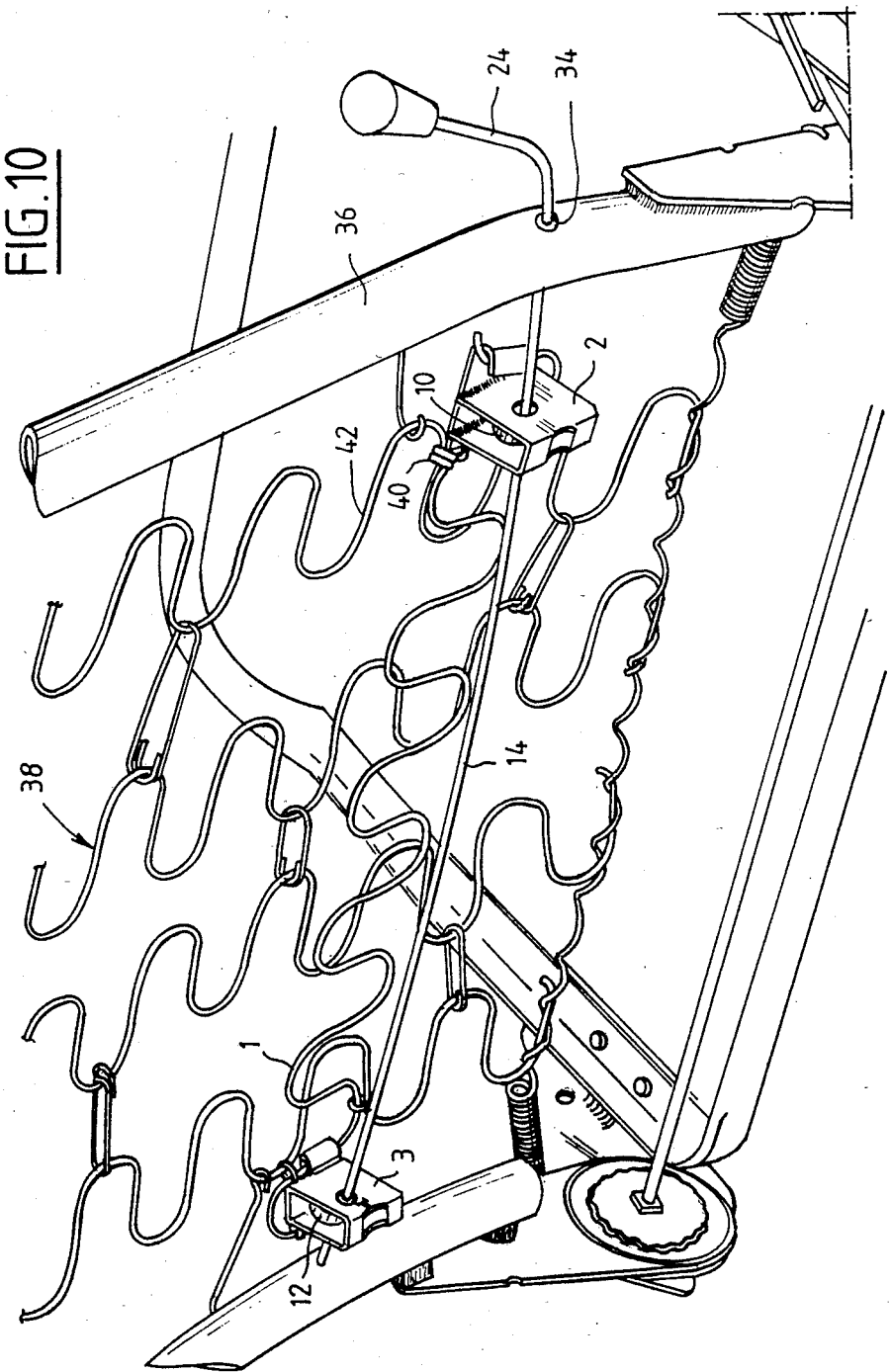

DEVICE FOR LOCALLY ADJUSTING THE TENSION OF AN ELASTIC SHEET, IN PARTICULAR FOR A VEHICLE SEAT

Users of motor vehicles no longer hesitate to-day to travel long distances. Unfortunately, there often results considerable physical fatigue, and in particular pains due to the compressing of the vertebrae brought about by the prolonged maintenance of the body in the same position.

An object of the present invention is to overcome this state of affairs by providing a device for locally adjusting the tension of an elastic sheet more particularly adapted to the adjustment of the seat back of a vehicle, which permits a modification of the firmness of the support provided locally by the elastic sheet and thus a limitation of the fatigue of the user.

The invention therefore provides a device for adjusting the tension of an elastic sheet which comprises a flat spring having end portions which are each fixed to two parallel surfaces between which surfaces a rotary disc is inserted, the two discs being connected to rotate together but being inclined in the opposite direction so that their rotation pivots in opposite directions the parallel surfaces of the two ends of the spring and results in a modification of the length and the curvature of the spring.

Thus, depending on the position of the rotory discs, the flat spring is displaced between an extreme position in which it is taut and stiff and a compressed bent extreme position corresponding to maximum flexibility, Between the two positions, the spring is flat at rest and this results in its normal elasticity.

The flat spring may easily be associated with an elastic sheet to which it transmits the tension or the bending imparted thereto by the discs.

Preferably, the spring is a flat sinusoidal spring of the same type as those making up the elastic sheet.

The rotary discs are mounted on a control rod with which they are connected to rotate and on which they are inclined.

Such a device is particularly adapted to the adjustment of the support in a motor vehicle seat. It is then preferably mounted in a lombar support region, the control rod being fixed to the uprights of the frame of the seat.

It will of course be understood that the elastic sheet may comprise a plurality of adjustment devices permitting a local modification in its tension in accordance with needs.

A description of an embodiment which is given merely by way of a non-limiting example and shown in the accompanying drawings, will bring out the advantages and features of the invention.

In the drawings:

FIG. 10 is a perspective view of a portion of the elastic sheet of the seat back of a vehicle provided with an adjusting device according to the invention.

Figure 1:
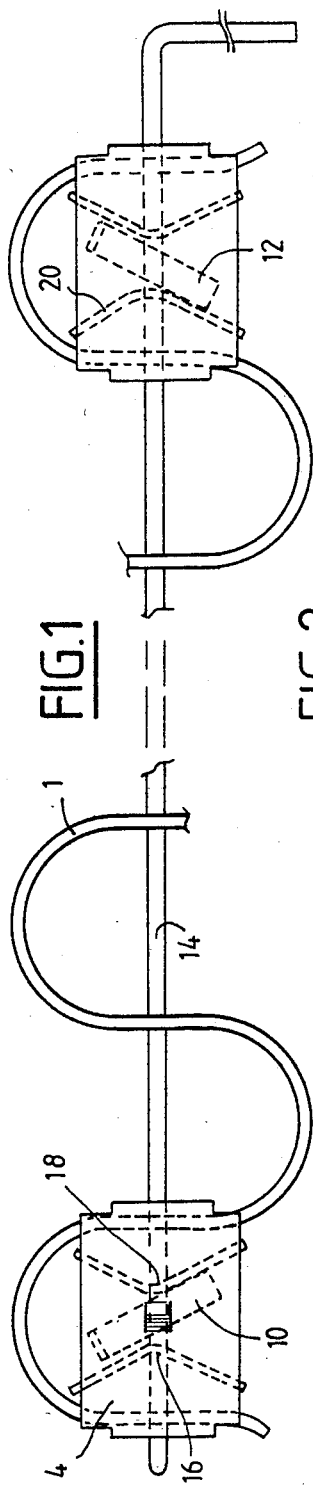
FIG. 1 is a front elevational view of the end portions of the device according to the invention, in its position of rest.

As shown in the drawings, the device according to the invention comprises a flat spring 1, preferably having a sinusoidal shape, the two end portions of which each carry a case 2, 3, fixed by a plate 4 to the spring and enclosing between its opposed lateral walls respectively 6 and 8 a disc 10, 12. The two discs 10 and 12 are fixed on a rod 14 with respect to which they are inclined in opposite directions, as clearly shown in FIG. 1. The two discs 10 and 12 are identical and are thus placed in a symmetrical manner relative to the median plane of the rod 14.

Figure 2:
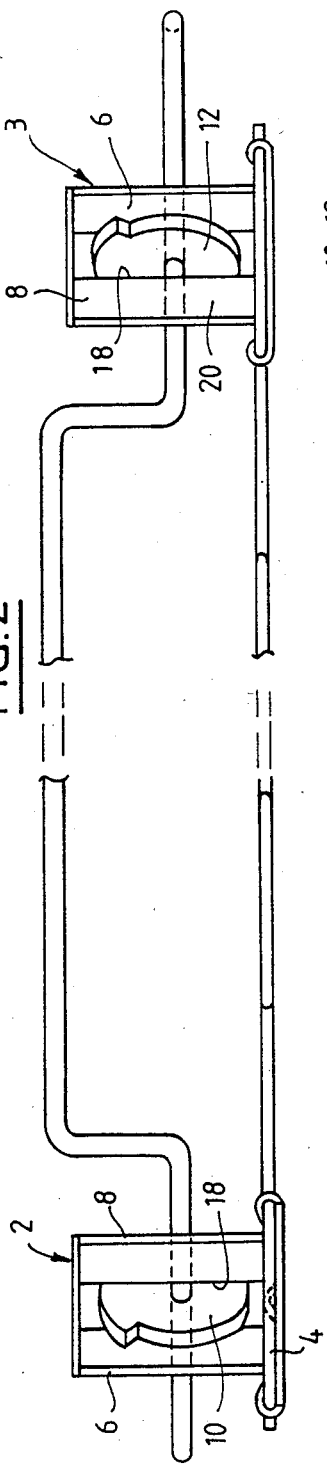
FIG. 2 is a top plan view of the device shown in FIG. 1.

In the position of rest, i.e. the position shown in FIGS. 1 and 2, the discs 10 and 12 are not in contact with the walls 6, 8 of the cases so that they exert no force against these walls. In fact, the walls 6 and 8 have the shape of a reclining V whose apices 16, 18 are in facing relation and define consequently a narrow passage whose width is slightly greater than the thickness of the discs 10, 12. The inclination of the sides 20 of the V's of the walls 6 and 8 substantially corresponds to the inclination on the rod 14 of the discs 10, 12 which are thus simply interposed between the two lateral walls of the corresponding case.

Each of the walls 6, 8 is provided with an opening 22 which allows the free passage of the rod 14 and even the rotation of the latter without driving the V's of the walls 6 and 8.

Consequently, when the rod 14, which is preferably provided with a control knob 24 which has not been shown in FIGS. 1 to 6, rotates about its axis and drives the discs 10 and 12, the latter rub against the apices 16, 18 of the lateral walls 6, 8 and tend to urge back the two walls of each case in opposite directions. The cases pivot on the rod 14 so as to converge either in the direction of the spring 1 or in the opposite direction.

Figure 3:
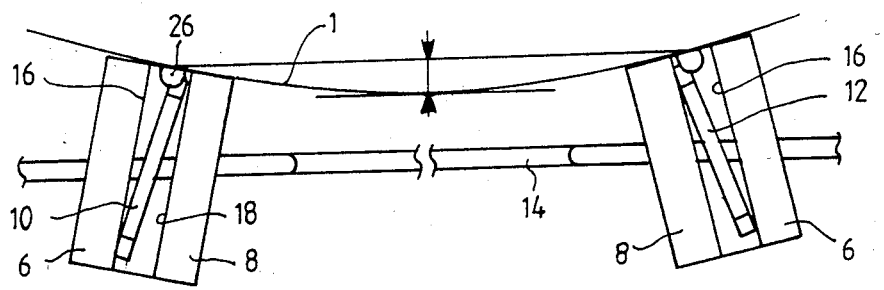
FIG. 3 is a diagrammatic view from below of the device in its bent position.
Figure 4:
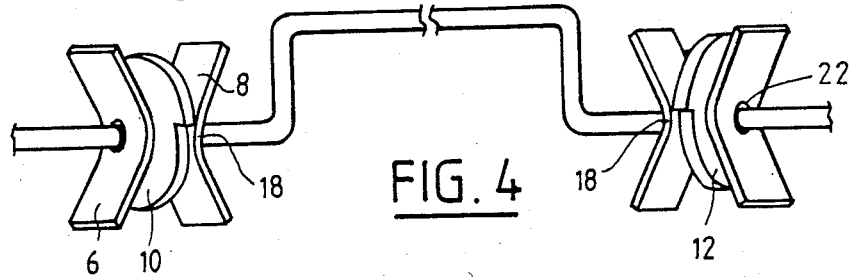
FIG. 4 is a diagrammatic view of the device shown in FIG. 3 whose spring has been eliminated.
Figure 5:
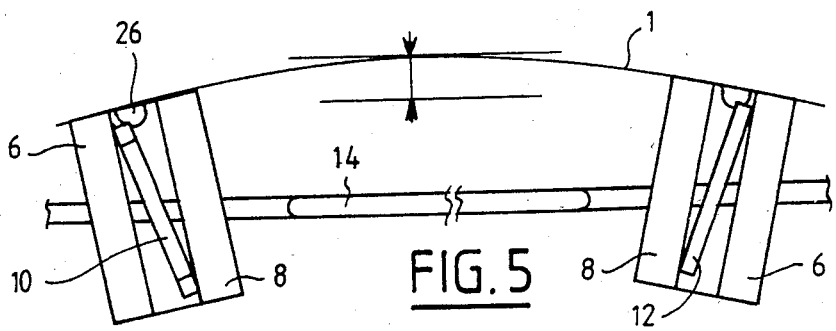
FIG. 5 is a view similar to FIG. 3 of the device in the stiffening position.
Figure 6:
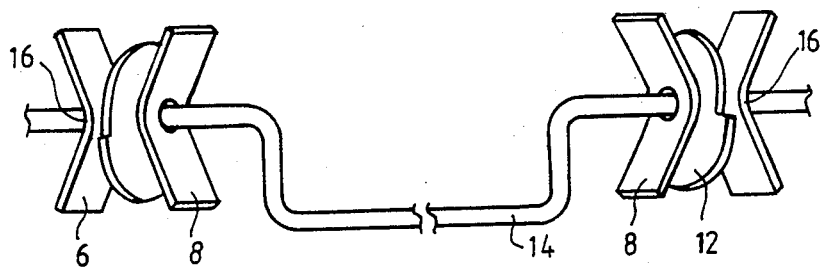
FIG. 6 is a view similar to FIG. 4 of the position of the discs when the spring is stiffened.

For example, if the rod 14 rotates in the clockwise direction as viewed in FIG. 1, the discs 10 and 12 gradually assume the position shown in FIGS. 3 and 4, i.e. tend to urge the walls 8 toward their end fixed to the spring 1 while they urge outwardly the end of the walls opposed to the spring 1. This results in a bending of the spring 1 in the direction of the rod 14 and at the same time a shortening of this spring.

The spring 1 thus bent of course has an increased flexibility. Inversely, if the rod 14 is turned in the counter-clockwise direction, the discs 10 and 12 assume the position shown in FIGS. 5 and 6. In this case, each of the discs urges outwardly the wall 6 at its end fixed to the spring 1 while the two discs bring closer together the ends of the walls 8 opposed to this spring 1. The spring is consequently taut and extended while assuming a curvature whose concavity faces the rod 14. The extension of the spring stiffens it and reduces its elasticity.

Figure 9:
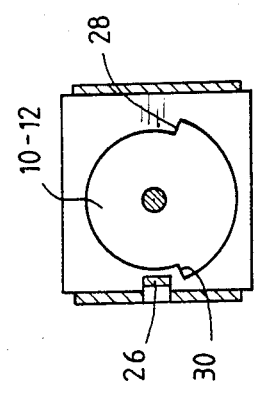
FIGS. 7, 8 and 9 are views of the control discs respectively in the positions corresponding to FIGS. 1, 3 and 5.

Preferably, each of the cases 2 and 3 includes on the plate 4 for fixing to the spring 1 a projection 26 while the discs 10 and 12 define two teeth respectively 28 and 30 facing in opposite directions. The cooperation of the teeth 28 and 30 with the projection 26 limits the displacement of the corresponding disc 10 or 12 and consequently provides a signal indicating the arrival of this disc in its extreme position. Indeed, when the device is in the inactive position shown in FIGS. 1 and 2, each of the discs is in the position shown in FIG. 7. The projection 26 of the case is substantially at equal distances from each of the teeth 28 and 30. Consequently, the rod can turn without difficulty in either direction and rotate the discs fixed thereto. Depending on the direction of rotation of the rod 14, the tooth 28 approaches the projection 26 and comes into abutment thereagainst (FIG. 8) or the tooth 30 approaches the projection 26 and comes into abutment thereagainst (FIG. 9).

Figure 7:
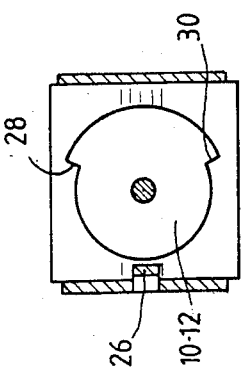
Figure 8:
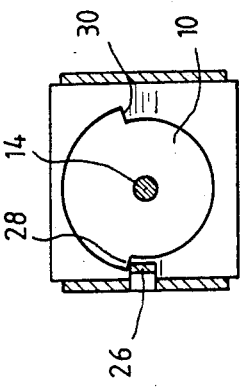

In each of these two last-mentioned positions, the disc 10, 12 has slightly passed beyond its unstable position and consequently tends to assume the following stable position constituted by the position offset 180° relative to the initial stable position shown in FIG. 7, i.e. to continue its rotation. The disc is therefore solidly urged against the projection 26 and locks itself in the position given thereto. Only a rotation of the rod 14 can change the position of the discs 10 and 12 and the spring 1.

Such a device permits, owing to the association of the spring 1 with an elastic sheet, a local modification of the tension of this sheet by varying the curvature and the length of the spring 1.

The elastic sheet may be made in various ways and may be employed in a seat, a box mattress or in any other application. The adjustment is however particularly important in the case of vehicle seat backs such as that partly shown in FIG. 10.

In this case, the rod 14 is mounted in apertures 34 formed in the vertical uprights 36 constituting the frame of the seat and to which the elastic sheet 38 is secured. The device is thus shown behind the elastic sheet, the spring 1 forming a transverse element of this sheet and being fixed by wire hooks 40 to the longitudinal springs of the sheet 38.

The spring 1 is thus in contact with the various springs. In the position of rest of the device, the spring 1 has no action on the springs of the elastic sheet. On the other hand when it is stiffened under the action of the discs 10 and 12 and reaches the position shown in FIGS. 5 and 6, it puts the springs 42 of the sheet 38 under tension and stiffens the seat back in the region in which it is located. On the other hand, when it is shortened and bent in the opposite direction, it imparts an additional elasticity to the whole of the sheet.

Preferably, an adjusting device of the type described hereinbefore will be mounted in the lumbar support region which is the region the most subject to a compressing of the vertebrae when using a vehicle seat. However, it will be understood that this adjusting device may easily be mounted in any other position and that even several adjusting devices may be mounted on the same seat back. In this way, the user is in a position to adjust at any moment the firmness of the support he receives and adjust it each time he desires.

Likewise, the rod 14 may be rectilinear as shown in FIG. 10, or be bent in its central part, as shown in FIGS. 1 to 6, or even have any other shape enabling it to cause the rotation of the discs 10 and 12 and the deformation of the spring 1 without affecting the action of the elastic sheet 38 itself.

What is claimed is:

1. A device for locally adjusting the tension of an elastic sheet, in particular for a vehicle seat back, said device comprising a flat spring having two end portions, means defining two parallel surfaces respectively rigid with each of said end portions, two rotary discs enclosed between said respective parallel surfaces, the two discs being connected to rotate with each other but inclined in opposite directions so that their rotation pivots in opposite directions the parallel surfaces rigid with the two end portions of the spring and brings about a modification of the length and of the curvature of the spring.

2. A device according to claim 1, wherein the flat spring has a sinusoidal shape.

3. A device according to claim 2, wherein the rotary discs are mounted on a common rod and are inclined in opposite directions relative to an axis of said rod.

4. A device according to claim 1, wherein the distance between the parallel surfaces is such that, in a position of rest, the respective disc is free therebetween and capable of urging them in opposite directions as soon as it is made to rotate.

5. A device according to claim 1, wherein the parallel surfaces are defined by central portions of two lateral walls arranged as a reclining V having apices which face each other.

6. A device according to claim 5, wherein the V-shaped walls are interconnected and form a case for housing the respective disc.

7. A device according to claim 5, wherein the sides of the V-shaped walls have inclinations which correspond to the angle of inclination of the discs so that, in the position of rest, the discs are parallel to the sides of the respective walls.

8. A device according to claim 1, wherein each disc comprises two teeth and means defining an abutment are provided for cooperation with the respective disc and stopping the rotation of the disc in a selected one of two positions corresponding to an extended spring and a shortened spring.

9. An elastic sheet, and in particular a vehicle back rest, combined with a frame for the sheet and at least one adjusting device for locally adjusting the tension of the elastic sheet, said device comprising a flat spring having two end portions, means defining two parallel surfaces respectively rigid with each of said end portions, two rotary discs enclosed between said respective parallel surfaces, the two discs being connected to rotate with each other but inclined in opposite directions so that their rotation pivots in opposite directions the parallel surfaces rigid with the two end portions of the spring and brings about a modification of the length and of the curvature of the spring, the lateral frame of the sheet comprising support means for the discs and the flat spring being connected at end portions thereof to elastically yieldable elements of the sheet and being in contact with all of said elastically yieldable elements so that the extension of the spring locally stiffens them while the shortening of the spring renders them more flexible.

10. A sheet according to claim 9, wherein lateral uprights of the frame are provided with apertures receiving a control rod of the device controlling the rotation of the discs.

11. A sheet according to claim 9, wherein the device is mounted in a lumbar support region of the elastic sheet.

* * * * *